United States Patent [19]
Zimmerman et al.

[11] 3,802,261
[45] *Apr. 9, 1974

[54] FLUID FLOW METERING METHOD AND SYSTEM

[75] Inventors: Carl W. Zimmerman; George V. Copland, both of Duncan, Okla.

[73] Assignee: Halliburton Company, Duncan, Okla.

[ * ] Notice: The portion of the term of this patent subsequent to Mar. 2, 1988, has been disclaimed.

[22] Filed: Mar. 10, 1972

[21] Appl. No.: 183,458

Related U.S. Application Data
[63] Continuation-in-part of Ser. No. 704,403, Feb. 9, 1968, abandoned.

[52] U.S. Cl............................................. 73/194 E
[51] Int. Cl............................................. G01f 1/00
[58] Field of Search ......... 73/194 R, 194 E, 61.1 R; 235/151.34

[56] References Cited
UNITED STATES PATENTS

| | | | |
|---|---|---|---|
| 3,043,508 | 7/1962 | Wright........................... | 235/151.34 |
| 3,176,514 | 4/1965 | Foster................................. | 73/229 |
| 3,237,453 | 3/1966 | Yamamoto et al. ................. | 73/194 |
| 3,329,017 | 7/1967 | Yamamoto et al. ................. | 73/194 |
| 3,336,801 | 8/1967 | Snavely............................ | 73/194 X |
| 3,402,606 | 9/1968 | Bruha ................................. | 73/194 |
| 3,425,274 | 2/1969 | Clement et al. ...................... | 73/194 |
| 3,580,072 | 5/1971 | Cox................................. | 73/205 R |

FOREIGN PATENTS OR APPLICATIONS

| | | | |
|---|---|---|---|
| 1,806,628 | 2/1969 | Great Britain....................... | 73/231 |

OTHER PUBLICATIONS
Takafuji, T. Temperature Compensation Device in Volume Flowmeter, From Journal of the Instrumentation Control Association Japan, 1965, Vol. 14, No. 2. pp. 1–3.

*Primary Examiner*—Jerry W. Myracle
*Attorney, Agent, or Firm*—Burns, Doane, Swecker & Mathis

[57] ABSTRACT

A fluid flow metering method and system using digital signals and logic for producing a compensated manifestation of fluid flow by the mathematical multiplication of two or more sensed parameters, one parameter being a fluid flow rate and the other one or more parameters being related to a condition of the fluid such as its constituency, pressure, density, dielectric constant, temperature or the like, where the parameters are represented by series of electrical pulses. The digital output signal pulses of the flowmeter are related to fluid flow, and are used to gate packets of high frequency pulses from a transducer. The duration of the pulse packet is designed to be less than spacing between two adjacent flow pulses at maximum flow rate, and the exact number of high frequency pulses in each packet is related to the condition of the fluid as sensed by the transducer.

In one embodiment, the duration of the packet is a function of time in which case the pulses in the packet may be gated from a continuous series of high frequency pulses having a frequency related to the condition of the fluid.

The flow pulses recorded in a first counter provide a manifestation of gross fluid flow. The pulses from the packets recorded in a second counter provide manifestation of compensated fluid flow. Subtraction of the pulse trains through suitable scalers can yield a manifestation directly related to the compensated fluid flow in the same units as are used in providing gross fluid flow. A transducer output linearizing circuit and a flowmeter bearing friction compensating circuit may optionally be incorporated in the described system.

27 Claims, 12 Drawing Figures

PATENTED APR 9 1974 3,802,261

FLUID FLOW METERING METHOD AND SYSTEM

This application is a continuation-in-part application of application Ser. No. 704,403, filed Feb. 9, 1968, for Fluid Flow Measuring Method and System, now abandoned.

BACKGROUND OF THE INVENTION

The problem of compensating fluid flowmeters for variable physical conditions of the fluid, such as composition, density, pressure, temperature and the like, has long been recognized and numerous methods and techniques have been used for various applications. Among these methods have been mechanical, electro-mechanical and electrical systems for integrating the output of a flowmeter and the output of a condition responsive transducer to yield a flowmeter reading compensated for a condition of the fluid.

Prior art systems of the foregoing type wherein a mechanical movement of the condition responsive sensor is used to control a mechanical integrator are illustrated by U.S. Pat. Nos. 3,012,436 to Myers and 3,066,529 to Warren.

In the electro-mechanical prior art systems illustrated by U.S. Pat. No. 3,176,514 to Foster, the mechanical movement output of the condition responsive transducer is typically utilized to control an electrical gate which diverts portions of the digital flowmeter signal into appropriate counters, the accumulated pulses being representative of the compensated fluid flow.

The use of a totally electrical system as illustrated in U.S. Pat. No. 3,043,508 to Wright results not only in the miniaturization of the apparatus but also in a reduced number of moving parts and problems of maintenance and repair. Totally electric systems offer greatly expanded flexibiilty in design as well.

In a totally electrical system it is desirable to accomplish the compensation through the utilization of digital electronic equipment, i.e., digital output signals from both the fluid flowmeter and the condition responsive transducer. This makes possible the utilization of pulse responsive circuitry throughout and eliminates the critical voltage level adjustments commonly required in analog systems. One or both of the input signals have been of analog form in conventional systems, such as that of U.S. Pat. No. 3,043,508 supra, and wholly digital systems for compensating a fluid flow have not heretofore been generally known.

Even in wholly digital systems, it has been a practice to provide only a few, e.g. 10 or less, condition responsive pulses for each flow responsive pulse generated packet of pulses rather than to provide the large number, at least 50 and desirably 100, 1000 or more, of condition related pulses in each pulse packet. In addition, these known wholly digital systems have subtracted the number of condition related pulses from the flow related pulses and have been limited to a narrow range of both flow and condition variation, e.g. less than 10 percent. In such systems the value of the condition related signal, whether initially digital in form or analog to be subsequently converted to digital form, must be zero for that value of the condition for which no modification of the flow related signal is desired.

A primary object of the method and system of the present invention is to avoid use of analog voltage signals and use only digital signals. In a preferred embodiment, the digital output signal of the flowmeter is used to gate a higher frequency signal to produce packets of pulses which are applied to an appropriate counting device. Where the system is used in conjunction with producing oil wells, a transducer may monitor one or more conditions of the fluid such as pressure, temperature, density and oil/water ratio. The transducer output signal is either initially generated as a pulse signal or is converted to that form before being combined in a mathematical relationship in incremental units of flow. The combined incremental units, a mathematical multiplication product of fluid flow rate and the condition for which compensation is to be made, are summed over a relatively larger quantity of flow in pulse counters or accumulator registers. The data in the accumulator registers may thereafter be processed in a digital computer or be translated by logic circuits to produce directly readable manifestations of the compensated fluid flow.

The concept of the present invention may be used in several different metering systems. In one system, the flow pulses are used to produce packets of pulses by gating the pulses emanating from the condition responsive transducer to an accumulator register. Where, for example, the transducer has a capacitance probe, the pulses accumulated in the register may be related to net-oil flow.

Another object of the present invention is to provide a novel method and system in which the flow related pulses are subtracted from the condition related pulses to provide the modified manifestation of fluid flow.

Still another object of the present invention is to provide a novel method and system operable over a wide range of variation in both flow and the condition for which compensation is desired.

Yet another object of the present invention is to provide a novel method and system in which the condition related signal need not be zero at the value of the condition for which modification of the flow related signal is desired.

In working with the foregoing digital or preferred embodiment of the system of the present invention, it has been observed that certain kinds of errors are inherent in the use of available hardware. The frequency output of the transducer in practice often does not have a precisely linear response relative to the variation of the fluid condition being sensed.

Another object of this invention accordingly resides in providing a circuit to correct or compensate for such non-linearity. This is particularly useful in those applications where directly readable manifestations of a net-oil flow are provided.

Still another object is to remedy the deficiencies of the prior art systems which have failed to provide compensation for bearing friction within the flowmeter which inhibits the rotation of the flowmeter rotor and thus the generation of flow responsive pulses. This failure to compensate for bearing friction of the flowmeter assumes increased significance when, as in the present system, each flow responsive pulse enables a gate to pass a large number of pulses into an accumulator register. Caution must be exercised in compensating the system for bearing friction by adding pulses, for each compensating pulse added at very low flow rates will result in the accumulation of a large number of pulses in the accumulator register.

Accordingly, the present invention provides for the addition of pulse packet gating, flow responsive pulses at flow rates which exceed a predetermined minimum.

In counting individual pulses in the packets which are generated in relation to fluid flow, the actual number of pulses appearing in the packets is much greater than the number of flow pulses. The number of pulses in the counter cannot be easily converted into a manifestation that is related to fluid flow, but instead must be interpreted only by reference to a table or chart.

Yet another object is to provide a novel method and system employing a subtraction process whereby the flow pulses and the pulses in the pulse packets are subtracted from one another through suitable scalers to provide a compensated manifestation in the same units as are used in registering gross fluid flow.

These and other objects and advantages will be apparent from the claims and from the following detailed description when read in conjunction wtih the appended drawings.

THE DRAWINGS

THE BASIC SYSTEM

Figure 1:
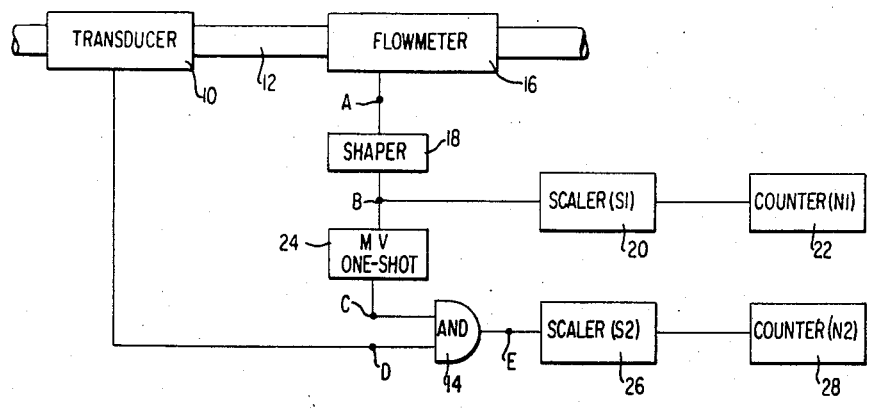
FIG. 1 is a functional block diagram illustrating the basic system of the present invention.
Figure 2:
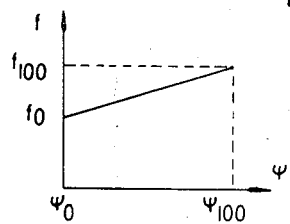
FIG. 2 is a graph illustrating the relationship between the output signal frequency and a variable condition of the flow stream as detected by the transducer.

Referring now to FIG. 1, a transducer 10 is disposed in a conduit 12 used to transport a fluid mixture of oil and water which may, for example, be located at a well testing station. Transducer 10 may be a capacitance probe oscillator conventionally used in a net oil analyzer and comprise a Clapp oscillator circuit having a variable capacitor in the electrical tank circuit which determines the frequency of the oscillator circuit. The variable capacitor is physically located in the conduit 12. The frequency of the oscillator varies as a function of the value of the capacitance of the probe conduit 12 and is thus responsive to changes in the dielectric constant of the material between the plates of the probe. As the dielectric constant for oil (about 2.5) is significantly less than that of water (80) and as a mixture of oil and water is present between the plates of the capacitance probe, the output frequency of the oscillator is related to the fractional volume of the flow stream which is oil, generally as illustrated in FIG. 2. In the system described, this frequency will be used as a measure of the percentage of oil in the conduit 12. The straight line relationship shown in FIG. 2 is for illustration purposes only since in practice the relationship extends only to about 50—50 mix of oil and water, and the curve in the region between 0 percent water up to 50 percent is not a truly linear relationship.

In the following discussion, it will be assumed that the capacitance probe oscillator frequency can be made to follow essentially the relationship shown in the graph of FIG. 2 over the range of the fractional volume of the flow stream which is oil that is encountered in practice. This relation may be expressed as follows:

$$f = f_0 + K\psi \tag{1}$$

where:

$f_0$ is the frequency at 0 percent oil (i.e., all water)
$K$ is a constant, and
$\psi$ is percent oil The electrical output signal from the oscillator, which is here regarded as being part of transducer 10, is fed to one input terminal D of AND gate 14 after shaping in conventional pulse shaping circuitry (not shown). These pulses are selectively gated, as will be described below, in accord with the fluid flow rate and are counted in counter 28.

Also disposed in conduit 12 is a flowmeter 16 which may be of any suitable type, such as the turbine mass flowmeter disclosed in U.S. Pat. No. 3,164,020 to Edward Groner et al. Alternatively, a suitable positive displacement meter may be employed.

An alternating voltage output signal from the flowmeter 16 is fed to a shaper 18 and from shaper 18 to scaler 20 and counter 22. Counter 22 provides a manifestation related to total flow. Both scaler 20 and counter 22 are conventional in operation. Scaler 20 may be any conventional circuit in which a predetermined number of pulses must be applied to the input terminal to generate a single pulse at the output terminal thereof.

Counter 22 may be likewise of any conventional electrical or electro-mechanical type and may, but need not, provide a visual indication of the count. A suitable counter, for example, is the Hecon series FR967 counter commerically obtainable from Hengstler Numerics, Inc., of Palisades Park, N.J.

The circuitry of shaper 18 is conventional and is designed to provide a steep wavefront triggering pulse suitable for operating sealer 20 and monostable or one-shot multivibrator 24. Multivibrator 24 produces an output pulse of fixed duration to enable AND gate 14 for the duration of the output pulse each time the multivibrator 24 is triggered.

It is necessary that the duration of the multivibrator 24 output pulse be less than the minimum time between adjacent pulses from flowmeter 16 at maximum flow rate and that it be sufficiently long to allow the passage of several pulses from transducer 10. A typical maximum output frequency from the flowmeter may be 800 Hz which means spacing between adjacent pulses will be at least 1,250 $\mu$s. The duration of the output pulse from flowmeter 16 may be therefore selected to be about 1,000 $\mu$s.

Figure 3:
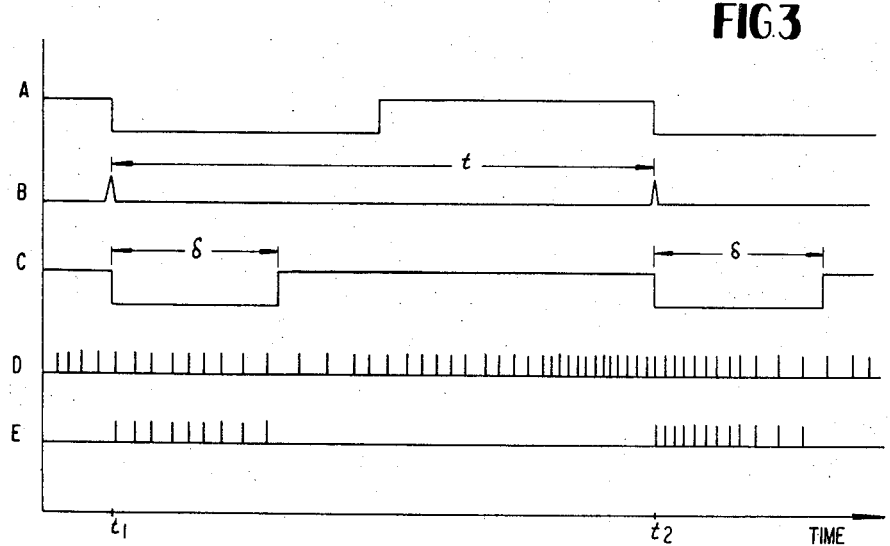
FIG. 3 is a timing diagram showing voltage waveforms at various points identified on the block diagram of FIG. 1.

The waveforms illustrated in FIG. 3 are those appearing at correspondingly labeled terminals in FIG. 1. The output signal from flowmeter 16 is generated directly or shaped to have the substantially square wave of waveform A, the frequency being related to fluid flow. An incremental integration period $t_1$ to $t_2$ is determined in the embodiment illustrated by successive negative going or trailing edges of each positive pulse of waveform A. The output pulse from shaper 18 at terminal B of FIG. 1 is illustrated as waveform B and is used to trigger monostable multivibrator 24 to produce the enabling signals for AND gate 14. The enabling signals have a duration $\delta$ and are illustrated in waveform C of FIG. 3.

The output of transducer 10 is illustrated in waveform D and is applied to terminal D of AND gate 14 in FIG. 1. The presence of an enabling pulse (waveform C) on terminal C of AND gate 14 allows the pulses in wave-form D applied to terminal D to be passed by AND gate 14 to the output terminal E as illustrated in waveform E.

The input signal from transducer 10 which is applied to terminal D of AND gate 14 in FIG. 1 is thus a train of pulses having a frequency or recurrence rate related to the oil fraction of the liquid flowing in conduit 12. The output of the flowmeter 16 is likewise a train of pulses having a frequency or recurrence rate related to the rate of fluid flow through conduit 12. The relative frequency of recurrence rate of the transducer 10 output pulses is desirably maintained quite high with respect to the output of the flowmeter 16 either by the design of the transducer 10 and flowmeter 16 or by the scaling of the flowmeter pulses applied to multivibrator 24. It is desirable, for reasons of accuracy, to have several scores or hundreds of pulses appear at the output of AND gate 14 in each gated period. Each pulse from flowmeter 16 will thus trigger multivibrator 24 which will in turn enable AND gate 14 for a period of time as determined by the time constant of the multivibrator 24; AND gate 14 then passes a large number of pulses to counter 28, the exact number of pulses passed being related to the oil fraction detected by transducer 10 during the period AND gate 14 is enabled by a pulse from multivibrator 24.

CALIBRATION

In an illustrative example, it will be assumed that the maximum frequency output of flowmeter 16 is 800 Hz. This corresponds to a period of 1250 $\mu$s. Therefore, the gate width $\delta$, see waveform C of FIG. 3, can safely be selected to be about 1,000 $\mu$s. By designing the oscillator circuit of transducer 10 to have an output frequency ranging from about 0.8 to 1 mHz., it is evident that each pulse packet as illustrated by waveform E of FIG. 3 will contain 800 to 1,000 pulses depending on the oil fraction.

The average percent oil factor $\psi$ can be shown to be $$\psi = 100/(\delta f_{100} - \delta f_0)[(S_2 N_2/S_1 N_1) - \delta f_0)]$$

(2)

where:

$f_{100}$ is the transducer frequency at 100% oil
$f_0$ is the transducer frequency at 0% oil (water only)
$S_1$ is the scaling factor of scaler 20
$S_2$ is the scaling factor of scaler 26
$N_1$ is the count register in counter 22, and
$N_2$ is the count register in counter 28.

Assuming that the gate width $\delta$ is fixed and that the scaling factors $S_1$ and $S_2$ have likewise been established, calibration is accomplished by pumping water through the system until totals $N_1'$ and $N_2'$ are accumulated in the counters. Setting $\psi=0$ and solving Equation 2 for $\delta f_0$, $$\delta f_0 = (S_2 N_2'/S_1 N_1')$$

(3)

By pumping 100 percent oil through the system until totals $N_1''$ and $N_2''$ are accumulated in the counters and setting $\psi=100$, Equation 2 may be solved for $\delta f_{100}$ $$\delta f_{100} = (S_2 N_2''/S_1 N_1'')$$

(4)

Since Equation 4 represents a special case, the more general equation for $\delta f_n$ may be derived by pumping an oil water emulsion with a known percent oil $\psi_n$ through the system until $N_1$ and $N_2$ are accumulated in the counters. Solving Equation 2 for $\delta f_n$:

$$\delta f_n = (100/\psi_n)[(S_2 N_2/S_1 N_1) - \delta f_0)] + \delta f_0$$

(5)

Substituting the values determined in Equations 3 and 5 into the general Equation 2 eliminates all variables other than $N_1$ and $N_2$ from the calculation of the net oil factor. Hence, the average percent oil factor may be determined by any numbers $N_1$ and $N_2$ in the counters.

By way of example, assume that the meter factor or number of pulses generated per bbl. of gross liquid flowing through flowmeter 16 is $37 \cdot 10^3$. The scaling factor $S_1$ of scaler 20 may be made $3.7 \cdot 10^3$ for convenience, i.e., for the counter to register in the desired units of measure (tenths of bbl.).

Setting the scaling factor $S_2$ of scaler 28 at $2124.8 \cdot 10^3$ and flowing water in the system with the output frequency $f_0$ of transducer 10 at $757.3 \cdot 10^3$ Hz., 447 counts are accumulated in counter $N_1$ and 319 counts in counter $N_2$. Solving Equation 3

$$\delta f_0 = 804.698$$

With crude oil having a 4.8 percent water cut ($\psi=95.2\%$) flowing in the system, the flow was allowed to continue until 309 counts were accumuated in $N_1$ and 559 counts in $N_2$. The output frequency of the transducer 10 was measured at $1018.494 \cdot 10^3$ Hz.

Solving Equation 5, $$\delta f_{95.2} = 1050.698$$

Substituting the calculated values of $\delta f_0$ and $\delta f_n$ in Equation 2, $$\psi = 233.443(N_2/N_1) - 327.113 \qquad (6)$$

The average percent oil factor can then be readily determined by calculation for any numbers $N_1$ and $N_2$ accumulated in the counters 22 and 28. Suitable charts can be prepared or computers used to determine the net oil flow.

DIRECT READING EMBODIMENT

Figure 4:
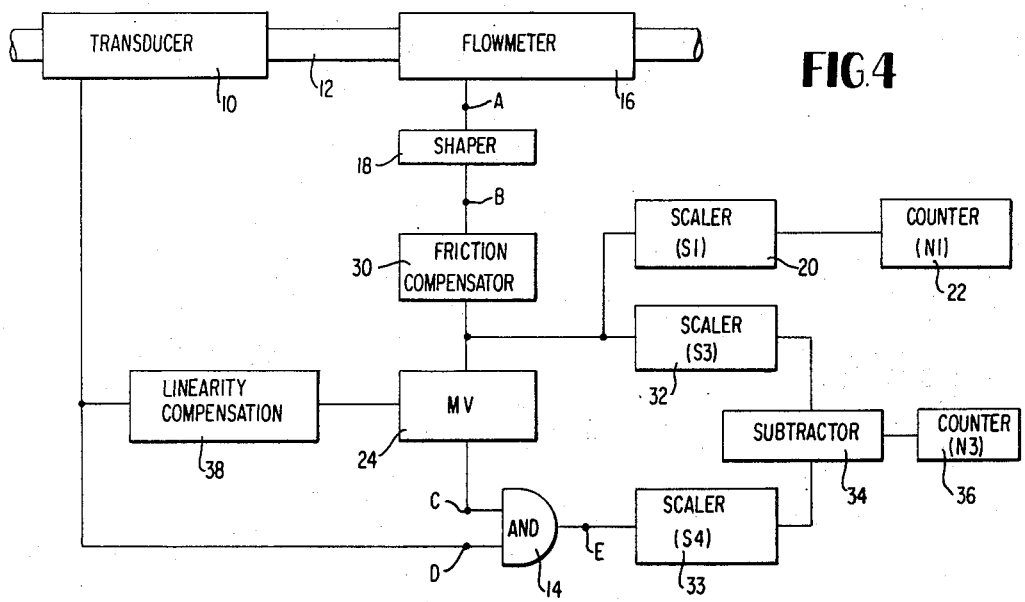
FIG. 4 is a functional block diagram of a further embodiment of the system of the present invention which produces a directly readable manifestation of the compensated flowmeter signal. Optional schemes to compensate the system for nonlinearity of the transducer output signal and to compensate the flowmeter output signal for losses due to bearing friction are also illustrated.

A second embodiment of the present invention is illustrated in the functional block diagram of FIG. 4. In this embodiment, the calculations necessary to provide a manifestation compensated to correct for the constituency of the liquid are performed through logic and a directly readable compensated manifestation of the net oil flow is obtained. The same reference designations have been used for corresponding parts to facilitate a comparison with FIG. 1.

With reference to FIG. 4, the same transducer 10, flow channel 12, and flowmeter 16 may be used as in the embodiment of FIG. 1. The output of shaper 18 is shown connected through a friction compensator 30 (normally only required when measuring gas flow) to multivibrator 24 which supplies the enabling pulses to terminal C of AND gate 14. Packets of high frequency pulses applied to terminal D from transducer 10 are passed through gate 14 to scaler 33. The output of scaler 32, which receives the flow representative pulses, and the output of scaler 33 are connected to a subtractor 34 to provide an output signal corresponding to the difference between its input signals. The output of subtractor 34 is totalized in counter 36.

The values for $\delta f_0$ and $\delta f_n$ may be determined in the same manner as described supra with respect to the embodiment of FIG. 1. These calculated values may then be used to calculate the scaling factors $S_3$ and $S_4$ of scalers 32 and 33, respectively, in the direct reading net oil analyzer of FIG. 4.

Assume a flowmeter factor of 15,000 pulses per barrel, a transducer frequency (100 percent oil) that would produce 1,000 pulses per gating period ($\delta f_{100}$), and a transducer frequency (0 percent oil) that would produce 800 pulses per gating period ($\delta f_0$).

Selecting $S_1$ as 1,500 in order that fluid flow may be registered in units of tenths of a barrel, the remaining scaler values will be:

$$S_3 = S_1(\delta f_{100} - \delta f_0/f_0) = 375 \qquad (7)$$

$$S_4 = S_3 \, \delta f_0 = 3 \cdot 10^5 \qquad (8)$$

From the foregoing, it may be seen that during the passage of 0.1 bbl. of water with zero oil fraction in the conduit 12, 1,500 pulses are generated by the flowmeter 16 and one pulse is registered on the gross fluid register (counter 22). Likewise, 1,500 pulses are applied to the input of scaler 32 and 1,500 packets each containing 800 pulses, or a total of $1.2 \times 10^6$ pulses, enter scaler 33. The output of scaler 32 is 1,500 divided by 375 or 4 pulses and the output of scaler 26 is $1.2 \times 10^6$ divided by 300,000 or 4 pulses. The subtractor 34 subtracts the output count of scaler 32 from that of scaler 33 and transmits the difference to the net oil counter 36 which is zero for the condition cited.

A flow of 0.1 bbl. of clean, dry oil in conduit 12 will also produce 1,500 pulses from the flowmeter 16 and 1,500 gating intervals. However, each gating interval now contains 1,000 pulses, and a total of $1.5 \times 10^6$ pulses enters scaler 33. The input to the subtractor from scaler 33 is $1.5 \times 10^6$ divided by 300,000 or 5 and the input from scaler 32 remains 4 pulses as in the condition of water flow cited previously. The difference of one count is registered in the net oil counter 36 as 0.1 barrel of oil.

Response of the instrument is linear to conditions intermediate to the two extremes indicated providing the flow stream is described by one or any combination of the following conditions in slug flow:

1. An oil-water emulsion in which the bound water in emulsion form is less than 50 percent of the volume of the true emulsion phase.
2. Free water.
3. Clean oil.

ACCURACY

A simple statement of measurement accuracy for true oil-water emulsions is not adequate to describe capacitance probe type net oil analysis devices for use in well testing. In addition to true oil-water emulsions, slug flow of such emulsions with free water is sometimes encountered in such service. Meaningful accuracy figures require statement of the gross flow indication based solely upon flowmeter accuracy and a separate statement of the accuracy of the indicated oil fraction which is defined as the ratio of the net oily reading to the gross flowmeter reading. Having these two figures, net oil measurement accuracy can be calculated for specific flow stream conditions. The system described may be made correct to within ±3 percent of the oil fraction for the conditions of flow cited above as providing a linear response.

The accuracy of the foregoing systems is, of course, enhanced by the high sampling rates. For a typical flow rate of 2½ barrels per minute over a two-minute period, the sampling rates may be 36,000 times per barrel for a 1 inch meter, 15,000 times per barrel for a 1½ inch meter, and in the neighborhood of 2,100 times per barrel for a 2 inch meter.

A system which samples on a saw-tooth, time-based scan voltage may have a rate of 40 times per minute or 16 samples in the typical example set out above. It is also likely that a system having such a low sampling rate will completely miss the sampling of the first or last 0.06 barrel of the liquid in a given dump of the separator. Since the initial liquid from a two-phase separator is nearly always free water and since the last of the liquid may be relatively clean oil, substantial errors are likely to be introduced in the utilization of any system having low sampling rates.

A system which samples the condition related signal as a function of flow to generate packets of pulses, but which subtracts the number of condition related pulses from the number of flow pulses, must also sample at relatively infrequent intervals and is severely limited as to the degree of variation, typically less than 10 percent, in either the condition or flow which can be accommodated with even this limited accuracy. Accuracy in such systems is also destroyed if the condition related signal is not zero for that value of the condition for which no modification of the flow manifestation is desired.

DETAILED CIRCUIT DESCRIPTION

While any conventional circuit for the multivibrator 24 may be utilized, the circuitry of the preferred embodiment utilizes a bistable multivibrator circuit modified to return to its reset condition by a special charging circuit rather than depending upon the time constant of a simple RC circuit, as is customarily used in a single shot or monostable multivibrator. The circuit illustrated in FIG. 5 contains a separate timing circuit in which a capacitor is charged from a constant current source to the predetermined firing potential of a unijunction transistor. The firing of the unijunction transistor is utilized to reset the bistable multivibrator circuit. The reason for the separate timing circuit will be later explained in connection with a circuit for compensating the output of transducer 10 for nonlinearities between the frequency response thereof and the condition sensed.

Figure 5:
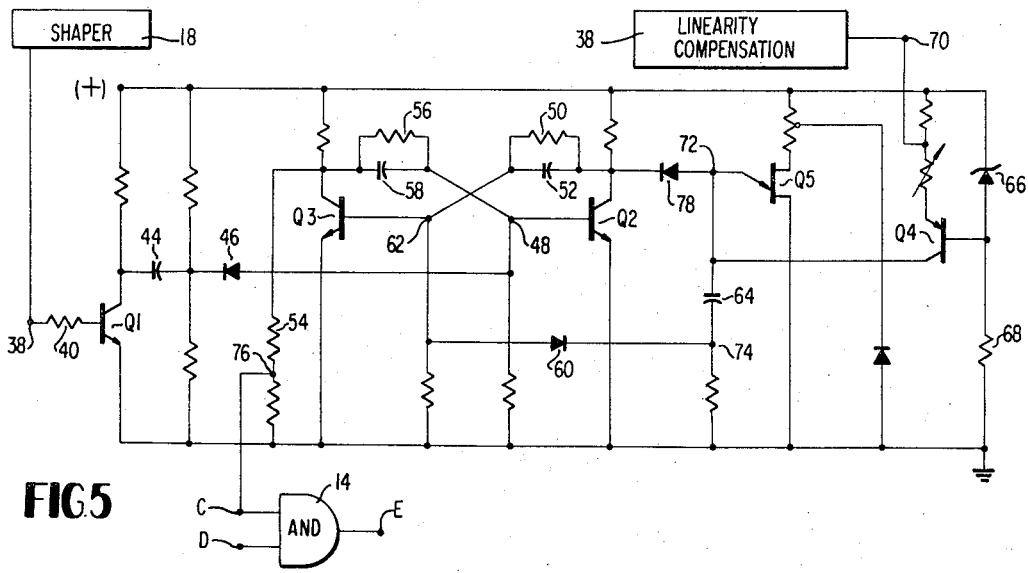
FIG. 5 is a schematic circuit diagram of a suitable multivibrator for use in the systems of FIGS. 1 and 4.

The multivibrator circuit of FIG. 5 is set with positive going pulses from the output of shaper 18 of FIG. 1 being applied to a terminal 38 which is in turn connected through resistor 40 to the base electrode of NPN transistor Q1. Transistor Q1 is biased to conduct upon the application of each positive pulse from shaper 18. The negative going output of transistor Q1 is taken from the collector electrode and is coupled through a capacitor 44 and a diode 46 to a terminal 48 of the multivibrator which comprises cross-coupled NPN transistors Q2 and Q3.

The application of a negative going pulse to the base electrode of NPN transistor Q2 drives it to cutoff and the positive going output as taken from the collector electrode is coupled through parallel connected resistor 50 and capacitor 52 to drive transistor Q3 into saturation. The negative going output of transistor Q3 is taken from the collector electrode and is applied across voltage divider 54 and also through resistor 56 and capacitor 58 to hold transistor Q2 in a nonconducting condition. The conductance states of transistors Q2 and Q3 will thus remain unchanged until the application of a negative pulse through diode 60 to terminal 62 at the base electrode of transistor Q3.

The emitter-collector path of PNP transistor Q4 in the extreme right-hand side of FIG. 5 provides a source of charging current for capacitor 64, the current remaining substantially constant as a result of the connection of the base electrode of transistor Q4 at the junction between Zener diode 66 and resistor 68. The current through the emitter-collector of transistor Q4 is thus responsive only to the emitter potential and may be varied only by the application of a potential to terminal 70. In the embodiment of FIG. 1, the circuit for linearizing the output of a transducer 10 has been omitted. Consequently, the current through the emitter-collector of transistor Q4 will not be varied in this embodiment and the width δ of the gate 14 enabling pulse will be a constant.

The potential appearing at terminal 72, the trigger electrode of unijunction transistor Q5, is determined primarily by the charge of capacitor 64. The parameters are chosen so that this charge accumulates linearly with respect to time due to the constant value of the charging current through the emitter-collector of transistor Q4, and thus the potential appearing at terminal 72 is a linearly increasing ramp which continues to increase until the firing potential of unijunction transistor Q5 is reached.

Capacitor 64 is completely discharged through unijunction transistor Q5 when the transistor fires. The voltage at terminal 74 is reduced and a negative pulse is applied through diode 60 to terminal 62 at the base electrode of transistor Q3 thereby reversing the conductance states of transistors Q2 and Q3 and removing the AND gate 14 enabling voltage of waveform C which is taken from terminal 76 on voltage divider 54. The constant current through transistor Q4 is inoperative to commence the timing period of the enabling of AND gate 14 due to the fact that the current is shunted to ground through diode 78 and transistor Q2 while it remains in saturation. Thus, no charge can be accumulated on capacitor 64.

Each flow meter pulse applied to terminal 38 will thus produce a change of conduction states of transistors Q2 and Q3 enabling AND gate 14. These conduction states will be retained for the period of time necessary for capacitor 64 to charge to the firing potential of unijunction transistor Q5 whereupon the AND gate 14 enabling pulse will be removed. The output of the multivibrator which appears at terminal C is that of the waveform C illustrated in FIG. 3. This output is applied to terminal C of the circuit diagram of AND gate 14 illustrated in FIG. 6 and next described.

Figure 6:
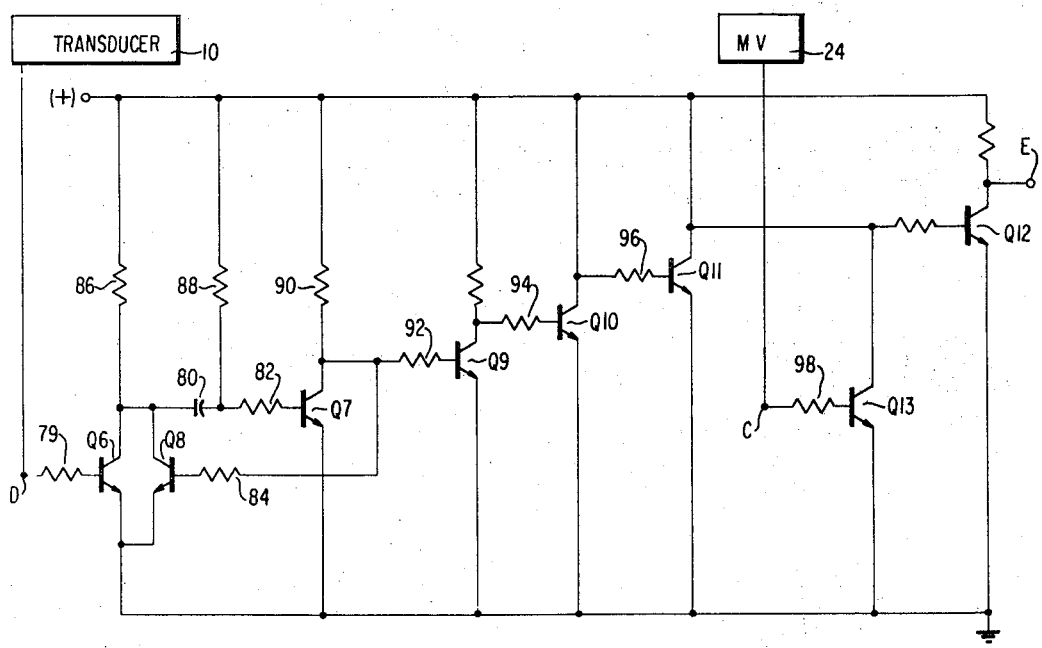
FIG. 6 is a schematic circuit diagram of a suitable gating circuit for use with the systems of FIGS. 1, and 4.

Referring now to FIG. 6 which shows a circuit for AND gate 14, the output of transducer 10 is applied through resistor 79 to the base electrode of NPN transistor Q6. Each positive going pulse supplied to the base electrode of transistor Q6 drives it into saturation and produces a negative pulse at the collector electrode. These negative going pulses are applied through capacitor 80 and resistor 82 to the base electrode of NPN transistor Q7. As transistor Q7 is driven into cutoff, the positive going potential at the collector electrode is fed through resistor 84 to the base electrode of NPN transistor Q8. Transistor Q8 is driven into saturation thereby shunting the emitter-collector path of transistor Q6 to drive it into cutoff until the application of the next pulse from transducer 10.

Transistors Q6, Q7 and Q8 are thus connected to function as a monostable or one-shot multivibrator. The duration of the positive going output pulse of Q7 is determined by the values of capacitor 80 and resistors 82 and 84, resistors 86, 88 and 90 being selected to provide appropriate bias voltages for their respective transistors. The duration is selected so that the circuits receiving these pulses will function satisfactorily.

The output taken from the collector electrode of transistor Q7 is applied through resistor 92 to a buffer consisting of NPN transistors Q9 and Q10. The positive going pulse input to the base electrode of transistor Q9 is inverted at the collector electrode and fed through resistor 94 to the base electrode of transistor Q10. The positive going output of transistor Q10 is taken from the collector electrode and is applied through resistor 96 to the base electrode of NPN transistor Q11.

The output of transistor Q11 is taken from the collector electrode and is a negative going, narrow pulse which drives NPN transistor Q12 into cutoff only when NPN transistor Q13 is in cutoff. The positive going output of transistor Q12 is taken from the collector electrode and is applied to terminal E at the input of the scaler 26.

The conduction of transistor Q13 is controlled by the output of multi-vibrator 24 applied to terminal C from the circuit shown in FIG. 5. Each negative going pulse at the output terminal C of multivibrator 24 is applied through resistor 98 to the base electrode to drive transistor Q13 into cutoff, the output of transistor Q11 being shunted to ground through the emitter-collector path of transistor Q13 when conducting. Thus, only for the duration of the period when transistor Q13 is in cutoff, i.e., the duration of the output pulse of multivibrator 24, can the conduction of transistor Q11 drive transistor Q12 into cutoff to produce an output pulse at terminal E. Transistors Q11 and Q13 thus function as an AND or coincidence gate and pass the output pulses of transducer 10 to terminal E only when an enabling signal from multivibrator 24 is present on terminal C.

Figure 7:
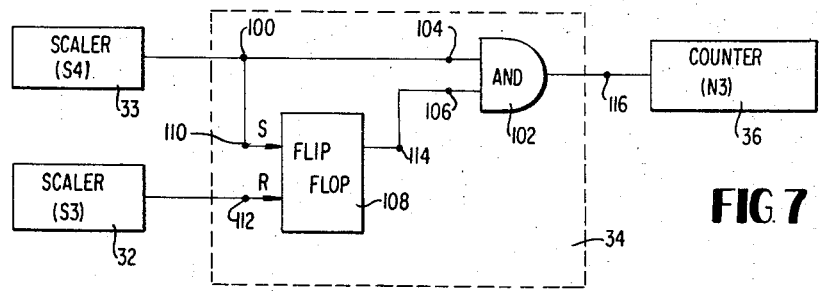
FIG. 7 is a logic diagram of a subtractor circuit that may be used in the direct reading system of FIG. 4.

The subtractor 34 of FIG. 4 may be a conventional updown counter or the like, or it may, as in the preferred embodiment, consist of the circuit illustrated in FIG. 7. The two input signals are from scaler 32 which receives the flow pulses and from scaler 33 which receives the pulses from AND gate 14.

Referring to FIG. 7, the output signal from scaler 33 (FIG. 4) is applied as an input signal to terminal 100 of the subtractor 34 which comprises an AND gate 102 having input terminals 104 and 106 and a flip-flop having input terminals 110 and 112. The output of flip-flop 108 is taken from terminal 114 and is applied as an enabling signal to input terminal 106 of AND gate 102. Once flip-flop 108 is set by an input signal at terminal 110, AND gate 102 will then be opened and pass pulses subsequently received from the scaler 33 to output terminal 116. The reception of a pulse from scaler 32 at reset terminal 112 causes gate 102 to be closed. Pulses appearing at output terminal 116 are used as a measure of net flow of one of either oil or water which, of course, can never exceed actual total flow as measured in counter 22 of FIG. 4.

In operation, a first pulse related to fluid flow from scaler 33 will set the flip-flop 108 and enable AND gate 102. That same pulse will not be passed through AND gate 102 due to delays built into the operation of the flip-flop 108. If the second pulse occurs on terminal 112, flip-flop 108 will be reset thereby removing the enabling puls from AND gate 102, and no pulse will be sent to counter 36. So long as the pulses applied to terminals 100 and 112 continue to alternate, no count will accumulate in counter 36. If the second pulse arrives at terminal 100 before the flip-flop 108 is reset, this second pulse (and any others which follow up until the moment when a flow pulse from scaler 32 is received) will be passed through AND gate 102 to output terminal 116 and into counter 36. The output of the subtractor 34 is thus a series of pulses equal in number to the difference between the inputs applied to terminals 110 and 112. The scaling factors of scalers $S_3$ and $S_4$ of FIG. 4 are not equal as pointed out above, and are selected to produce in counter 36 a manifestation that is directly readable and capable of interpretation without use of tables or supplemental calculations.

TRANSDUCER LINEARITY COMPENSATION

As indicated in FIG. 4, a linearity compensating circuit 38 may be connected between the output of transducer 10 and multivibrator 24. The purpose of this linearity correction circuit is to adjust for nonlinearities in the relationship between the frequency or pulse recurrence rate of the output signal from transducer 10 and a condition of the fluid in conduit 12. While FIG. 2 shows a linear relationship which is desired, in practice deviations in the linearity of this relationship occur, and it is the purpose of this circuit to produce a correction factor that will improve the overall accuracy of the instrument. The correction, according to this aspect of the invention, is made by vaying the width of the enabling pulse supplied to AND gate 14 by the output of multivibrator 24 in a manner to effect a linear relationship between the frequency of the transducer 10 output signal and the condition of the fluid being sensed.

Figure 8:
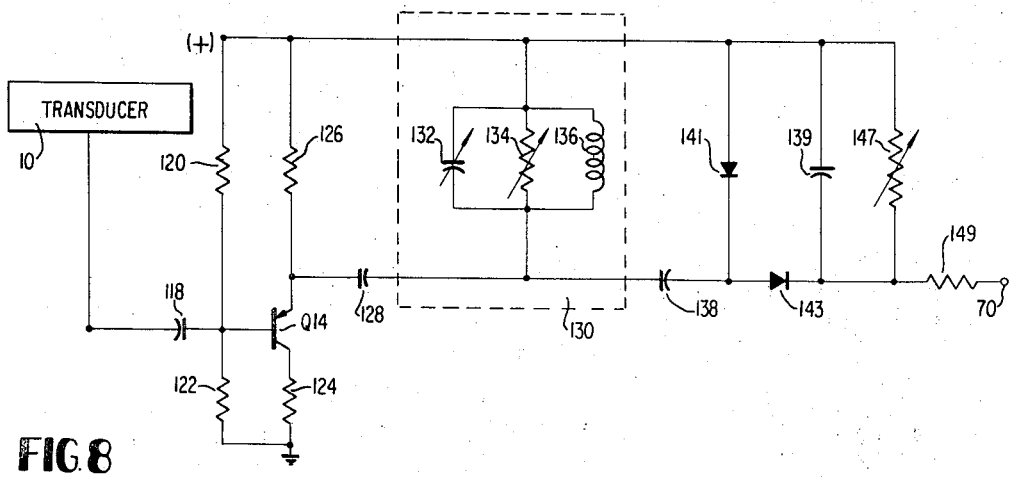
FIG. 8 is a schematic circuit diagram of a suitable linearity compensator for use with the system of FIG. 4.

A detailed circuit diagram for the linearity correction circuit 38 is illustrated in FIG. 8. This circuit basically comprises a frequency sensitive tuned circuit 130 which selectively decreases the amplitude of pulses originally having equal amplitudes. The exact amount of attenuation is dependent upon the instantaneous frequency of the pulses; thereafter the D.C. potential developed across capacitor 139 is applied to terminal 70 of FIG. 5 to vary the otherwise constant current flow rate through transistor Q4 which charges capacitor 64. Any variation in the potential applied to terminal 70 will thus vary the length of time required for terminal 72 to reach the firing potential of unijunction transistor Q5. The firing of transistor Q5, it will be recalled, generates the triggering pulse which switches the conduction states of multivibrator 24 to terminate the AND gate 14 enabling pulse.

Referring now to FIG. 8, the shaped output signal of transducer 10 is coupled through capacitor 118 to the base of emitter of PNP transistor Q14. Resistors 120, 122, 124, and 126 provide the appropriate biasing for transistor Q14, resistor 126 additionally serving as the load resistor. The variable frequency, uniform amplitude and width pulses taken from the emitter electrode of transistor Q14 are applied through capacitor 128 to a resonant circuit or filter 130.

Resonant circuit 130 comprises a variable capacitor 132, a variable resistor 134, and an inductor 136. As is well known, the resonant frequency of a parallel LC circuit may be varied by varying the reactance of either one of the reactance elements. In the illustrated embodiment, capacitor 132 is variable. The Q or shape of the impedance vs. frequency curve of a parallel LC filter or tuned circuit may also be modified by changing the resistance of the circuit. To this end, resistor 134 is made variable. By the selective adjustment of resistor 134 and capacitor 132, the amplitude of the signal applied through capacitor 138 at a particular frequency may be controlled.

The output signal from filter 130 is coupled through capacitor 138, and an average voltage is provided across capacitor 139 by diodes 141 and 143 in a known manner. The resistance of the gain controlling resistor 147 may be varied so as to provide for the adjustment of the rate of discharge of the capacitor 139 and thus the current which flows through resistor 149 to terminal 70 in tne multivibrator 24 circuit illustrated in FIG. 5.

The nonlinearity of the frequency $f$ vs. net oil percentage factor $\psi$ can be determined empirically and compensating variations in the gate width $\delta$ may be calculated for any percentage oil factor $\psi$ from the following:

$$\delta = [\psi(\delta f_{100} - \delta f_0) + \delta f_0]/(100f) \quad (9)$$

where $f$ is the measured frequency of transducer 10 at a particular value of $\psi$, $\delta f_0$ is the gate width at frequency $f_0$ and $\delta f_{100}$ is the gate width at frequency $f_{100}$.

This linearity compensating circuit is more fully disclosed and claimed in the copending application, Ser. No. 684,042, filed Nov. 17, 1967, of Joseph E. Thomas, and assigned to the assignee of the present invention; the disclosure of that application is hereby incorporated by reference.

FLOWMETER BEARING FRICTION COMPENSATION

Referring again to FIG. 4, a flowmeter bearing friction compensator 30 may be connected between shaper 18 and multivibrator 24. This circuit is provided to compensate for bearing friction in flowmeter 16 which retards rotation of the flowmeter at all rates of fluid flow through conduit 12. In practice, bearing friction losses are not normally significant except in connection with the measurement of gas flow.

Compensation is achieved by adding pulses to the input of multivibrator 24 from a source separate from the flowmeter. These compensating pulses cannot, however, be continuously added since pulses from transducer 10 are continuously present on terminal D of AND gate 14 irrespective of whether or not there is actual flow of fluid in conduit 12. An error would be introduced in the pulse counts accumulated in the counter 36 if bearing friction compensating pulses were allowed to enter the system as by triggering multivibrator 24 when the flow rate is zero. Accordingly, provision is made to inhibit the addition of the friction compensating pulses for flow rates below a predetermined value.

Figure 9:
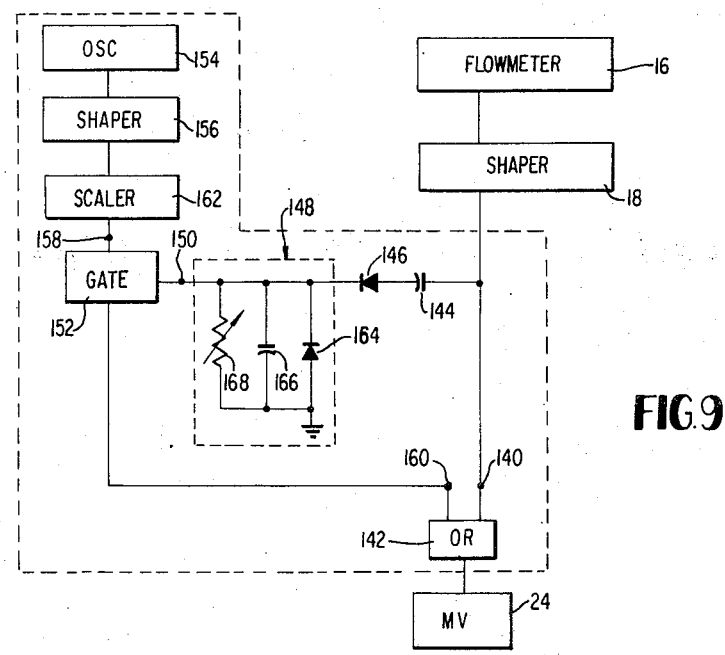
FIG. 9 is a functional block diagram of the bearing friction compensation circuit adapted for use in the system of FIG. 4.

With reference to FIG. 9, the operation of friction compensator 30 will now be described. Basically, the shaped output pulse from flowmeter 16 is applied to terminal 140 of OR gate 142 and through coupling capacitor 144 and diode 146 to the diode pump circuit 148. The output of circuit 148 is connected to input terminal 150 of gate 152 as an enabling signal.

The output of a fixed frequency oscillator 154 is shaped in shaper 156 and applied to terminal 158 of gate 152. The output signal of the gate 152 which comprises pulses similar to those from flowmeter 16 is applied to the other input terminal 160 of OR gate 142. The output of the OR gate 142 is fed to the multivibrator 24. A scaler 162 may be added as necessary to reduce the effective operating frequency of the oscillator 154.

In operation, the diode pump circuit 148 operates to provide an enabling signal to gate 152 only when the shaft of flowmeter 16 is rotating, i.e., when pulses are being generated. This means that the fixed frequency output pulses of oscillator 154, which may optionally be reduced by means of scaler 162, are added to the pulses applied to the input of multivibrator 24 by OR gate 142 only when the fluid flow through conduit 12 is sufficient to overcome the bearing friction of the flowmeter 16.

The diode pump circuit 148 comprises diode 164, capacitor 166 and resistor 168 connected in parallel to ground. The pulses from shaper 18 are coupled through capacitor 144 and diode 146 to add an increment of charge to capacitor 166 which is continuously discharging through resistor 168. Gate 152 is enabled by a charge on capacitor 166 in excess of a predetermined level and remains continuously enabled if the pulses from flowmeter 16 arrive at intervals less than the time necessary for capacitor 166 to discharge below the predetermined level through resistor 168. Resistor 168 is made variable to facilitate adjustment of the rate of discharge of capacitor 166 and thus the length of time after the application of a flow responsive pulse to the diode pump circuit that gate 152 will remain enabled.

Figure 10:
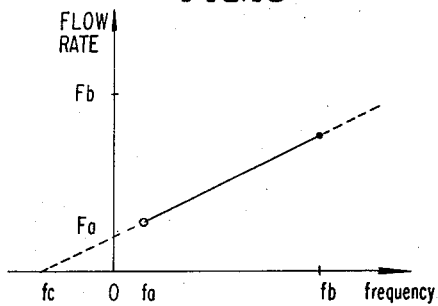
FIG. 10 is a graph illustrating the relationship of flow rate and flowmeter frequency due to bearing friction.

Referring to FIG. 10, flow rate F vs. the output frequency $f$ of flowmeter 16 is plotted over the operating range $f_a$ to $f_b$ of the flowmeter. From the graph, it is apparent that the frequency $f_c$ of the pulses necessary to correct for the effects of friction may be determined by the equation:

$$f_c = [F_a(f_b - f_a) - f_a(F_b - F_a)]/(F_b - F_a) \quad (10)$$

Hence, the frequency $f_c$ of oscillator 154, or, more specifically, the output signal from scaler 162, may be determined by the above equation so that additional flow pulses are added during operation of the flowmeter.

GAS MEASURING SYSTEM

While the foregoing description of the present invention has been with respect to the determination of the net oil flowing in a fluid mixture of oil and water, it is to be understood that the invention is not limited to this application. It may be used with any flow measuring system and transducer 10 may be responsive to other parameters or conditions of the fluid such as density, temperature, color, or the like. The present invention may be used with similar utility in producing oil wells as a system for producing a compensated gas flowmeter corrected for rapid fluctuations in pressure, the system being installed in the gas flow conduit of a liquid-gas separator at the wellhead.

Figure 11:
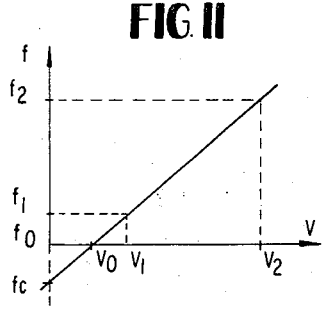
FIG. 11 is a graph illustrating the relationship of volumetric flow rate and the frequency response of the flowmeter.

In a gas system compensated for abrupt variations of pressure and flow rate of the type described, the frequency response of the flowmeter 16 may vary as illustrated in the graph of FIG. 11, where the frequency $f$ of the flowmeter 16 is plotted along the Y axis and the volumetric flow rate V is plotted along the X axis. The frequency $f_c$ of oscillator 154 of FIG. 9 that is necessary to compensate for bearing friction of a gas flowmeter 16 is indicated on the graph.

Figure 12:
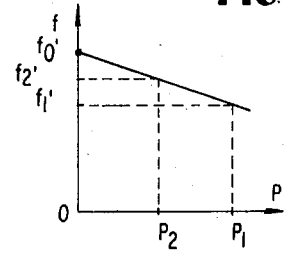
FIG. 12 is a graph illustrating the relationship of absolute pressure and the frequency response of a pressure transducer used to modify the manifestation of volumetric gas flow rate.

The frequency response of the pressure transducer 10 may vary as illustrated in FIG. 12 where the frequency of the transducer 10 is plotted against absolute pressure. If the response is linear, it is not necessary to use a linearity compensation circuit such as that described in connection with FIG. 8. Hence, the system for measuring gas flow may be that illustrated in FIG. 1 modified as indicated in FIG. 9. However, to provide a direct reading system, the use of an adder-subtractor circuit as illustrated in FIG. 4 is necessary. The connections of the scalers 32 and 33 must, of course, be reversed to produce the desired result.

When working with a system such as illustrated in FIG. 4, the scaling values for scalers 32 and 33 may be calculated as follows:

$$S_3 = \frac{P_s T (f_2' - f_1')(f_2 - f_1)}{T_s [f_2'(P_1 - P_2 + P_2(f_2' - f_1'))][v_2 - v_1]} \quad (11)$$

and $$S_4 = (S_3 \delta / S)[f_2' + P_2(f_2' - f_1'/P_1 - P_2)] \quad (12)$$

where $P_s$ and $T_s$ are the standard values of pressure in p.s.i.a. and temperature in degrees Rankine at which volumetric flow readout is desired, and the other terms are evident from FIGS. 9, 11 and 12.

The bearing friction compensation frequency $f_c$ of FIG. 9 may be calculated as follows:

$$f_c = [V_1(f_2 - f_1) - f_1(V_2 - V_1)] / (V_2 - V_1) \quad (13)$$

The term $S$ which appears in Equation 12 above is the scaling value of a scaler (not shown) which may be used to reduce the frequency of the pulses applied to multivibrator 24. Such reduction may be desirable as the gate width $\delta$ must be of sufficient duration to include enough cycles of the digital signal from the pressure transducer 10 to obtain the desired degree of resolution and accuracy within the capabilities of the transducer 10. A minimum of 400 cycles should be included in the period $\delta$ but statistical accuracy may suffer due to insufficient frequency of sampling if the line pressure variations are frequent. The scaling factor S of this scaler must, as indicated in Equation 14, be greater than the gate width $\delta$ divided by the time $t$ indicated on the waveforms of FIG. 3.

$$S > (\delta/t) \quad (14)$$

By way of example, assume that the characteristics of the flowmeter at a constant line temperature and pressure are such that $f_2 = 2,550$ Hz. for a volumetric flow rate of 36,000 cf./day and $f_1 = 140$ Hz. for a volumetric flow rate of 3,600 cf./day where the mean temperature T is 70° F. and the mean pressure P is 14.2 p.s.i.a. Assume also that the time interval $t$ in seconds between flowmeter pulses is one five-thousandths and that the frequency $f_2'$ and $f_1'$ of the transducer 10 is 1,000 Hz. at zero p.s.i.g. and 800 Hz. at 100 p.s.i.g. respectively.

To register one pulse for each 100 cf. of gas corrected to a standard pressure $P_s$ of 14.7 p.s.i.a. and a temperature $T_s$ of 60° F., select a gating interval $\delta$ of 0.5 second.

From Equation 14

$$S > (0.5)(5,000) > 2,500$$

where 5,000 Hz. being greater than $f_2$ of 2,550 Hz. allows for over ranging.

Setting $S = 2,600$ and solving Equation 11 for $S_3$ $$S_3 = 18,726$$

where the quantity $(V_2 - V_1)$ in cf./day is divided by (100) (3,600) (24) to convert to hundreds of cf./sec.

From Equation 12

$$S_4 = 3,703$$

From Equation 13

$$f_c = 127.8 \text{ Hz.}$$

From the foregoing description of the basic system, it is seen that fluid flow rate responsive pulses are used to pass packets of fluid condition responsive pulses to appropriate scaling and counting apparatus, the number of pulses in each packet being directly related to the condition of the fluid being sensed.

SUMMARY OF THE INVENTION

From the foregoing, it is evident that fluid flow rate responsive pulses are used to gate packets of pulses to appropriate scaling and counting apparatus with the number of pulses in each packet being related to some condition of the fluid such as constituency, pressure, temperature, density, or the like.

Implementation of the above concept may be accomplished in a preferred embodiment by using the flow responsive pulses to enable a gate for a nominally fixed predetermined time interval and using the output signal of a variable frequency condition responsive transducer as the signal which is counted in a suitable accumulator register. The number of pulse packets is, however, always related to fluid flow and the number of pulses in any packet is a function of one or more variable conditions by which the flowmeter output is to be modified or compensated. The large number of condition related pulses in each flow related packet of pulses permits vastly increased resolution over known systems. Where a subtractor circuit together with suitable scalers is provided, directly readable manifestations are produced by subtracting flow related pulses from the condition related pulses in the packets of pulses. Through this technique, a greatly expanded acceptable range of the change in both the rate of fluid flow and the condition for or conditions for which modification of the flow manifestation is desired may be achieved. In addition, the value of the condition related signal, whether initially generated in analog or digital form, need not be zero for that value of the condition or conditions for which no modification of the flow manifestation is desired.

Finally, these systems lend themselves readily to the use of a circuit adapted to provide bearing friction compensation. Linearity compensation may also be provided for the nominally fixed time interval embodiments.

The present invention may thus be embodied in other specific forms without departing from the spirit or essential characteristics thereof. The presently disclosed embodiments are therefore to be considered in all respects as illustrated and not restrictive, the scope of the invention being indicated by the appended claims rather than by the foregoing description, and all changes which come within the meaning and range of equivalency of the claims are therefore intended to be embraced therein.

What is claimed is:

1. The method of measuring fluid flow comprising the steps of:
   a. generating a digital signal having a frequency related to fluid flow which varies up to a predetermined maximum;

b. generating a signal responsive to a variable physical condition of the fluid;

c. sampling the condition responsive signal in response to pulses in the digital flow responsive signal to produce packets of pulses wherein the number of packets is related to fluid flow and wherein the number of pulses in each packet is related to the variable physical condition of the fluid, the number of samples being at least as great as the number of pulses in the digital flow responsive signal and the duration of each sample being less than the time interval between pulses in the digital flow responsive signal at the predetermined maximum frequency; and, d. subtracting the number of pulses in the digital flow responsive signal from the number of pulses in the packets of pulses over a long period of time.

2. The method of claim 1 wherein there is at least 100 pulses in each packet of pulses produced irrespective of the rate of fluid flow and the value of the variable physical condition.

3. The method of claim 2 wherein the condition responsive signal is a digital signal having a frequency at least an order of magnitude greater than the predetermined maximum frequency of said flow responsive signal.

4. The method of measuring fluid flow comprising the steps of:

a. generating a digital signal having a frequency related to fluid flow which varies up to a predetermined maximum;

b. generating a signal responsive to a variable physical condition of the fluid;

c. sampling the condition responsive signal for periods less in duration than the time interval between pulses in the digital flow responsive signal at the predetermined maximum frequency in response to pulses in the digital flow responsive signal to produce packets of pulses wherein the number of packets is related to fluid flow and wherein the number of pulses in each packet is at least 100 and is related in number to the variable physical condition of the fluid; and, d. summing the number of pulses in the packets over a long period of time.

5. The method of measuring fluid flow comprising the steps of:

a. generating a digital signal having a frequency related to fluid flow and a range ability greater than 10;

b. generating a signal responsive to a variable physical condition of the fluid, the physical condition being variable by at least 10 percent;

c. sampling the condition responsive signal responsively to pulses in the digital flow responsive signal to produce packets of pulses wherein the number of packets is related to fluid flow and wherein the number of pulses in each packet is related to the variable physical condition of the fluid; and, d. summing the number of pulses in the packets over a long period of time.

6. The method of measuring fluid flow comprising the steps of:

a. generating a digital signal having a frequency related to fluid flow;

b. generating a signal responsive to a variable physical condition of the fluid, the condition responsive signal having a value other than zero at the value of the condition at which no compensation is desired;

c. sampling the condition responsive signal responsively to pulses in the digital flow responsive signal to produce packets of pulses wherein the number of packets is related to fluid flow and wherein the number of pulses in each packet is related to the variable physical condition of the fluid; and, d. summing the number of pulses in the packets of pulses over a long period of time.

7. The method of claim 6 wherein the range of the digital signal is greater than 10; and, wherein the condition responsive signal is variable by more than 10 percent.

8. The method of measuring fluid flow comprising the steps of:

a. generating a digital signal having a frequency related to fluid flow which varies up to a predetermined maximum;

b. generating a signal variable from a first value other than zero to a second value other than zero in response to a variable physical condition of the fluid;

c. sampling the condition responsive signal for time intervals less in duration than the interval between pulses in the digital flow responsive signal at the predetermined maximum frequency in response to pulses in the digital flow responsive signal to produce packets of pulses wherein the number of packets is related to fluid flow and wherein the number of pulses in each packet is related to the variable physical condition of the fluid; and, d. summing the number of pulses in the packets over a long period of time.

9. The method of claim 8 wherein the condition responsive signal has a value other than zero at the value of the condition for which no compensation of the fluid flow responsive signal is desired.

10. The method of producing a directly readable, modified manifestation of the digital output of a fluid flowmeter comprising the steps of:

generating a first series of pulses having a frequency related to fluid flow;

generating packets of pulses which are commenced in response to pulses in said first series of pulses, the exact number of pulses in each packet being related to a factor by which the fluid flow manifestation is to be modified; and, producing the modified manifestation by subtracting the number of flow related pulses from the number of pulses occuring in the packets during the same time interval.

11. A method of measuring fluid flow in a flow channel where both flow rate and a physical condition of the fluid may be variable by more than 10 percent comprising the steps of;

producing a first signal related to fluid flow;

generating a second signal related to a variable condition of the fluid; and, summing over a long period of time the incremental mathematical product of the instantaneous fluid flow rate and said variable condition by generating packets of pulses where the exact number of pulses in each packet is at least 50 and is related to said condition and the number of packets produced during the long period time is related to fluid flow.

12. Apparatus for measuring fluid flow compensated for a variable physical condition of the fluid comprising:
means for generating a digital signal having a frequency related to fluid flow which varies up to a predetermined maximum;
means for generating a signal responsive to a variable physical condition of the fluid;
means for sampling the condition responsive signal in response to pulses in said digital flow responsive signal to produce packets of pulses wherein the number of packets is related to fluid flow and wherein the number of pulses in each packet is related to the variable physical condition of the fluid, the number of said samples being at least as great as the number of pulses in said digital flow responsive signal, the duration of each of said samples being less than the time interval between pulses in the said digital flow responsive signal at the predetermined maximum frequency; and,
means for subtracting the number of pulses in said digital flow responsive signal from the number of pulses in said packets of pulses over a long period of time to provide a compensated measure of fluid flow.

13. The apparatus of claim 12 wherein each of said packet of pulses produced includes at least 100 pulses irrespective of the rate of fluid flow and the value of the variable physical condition.

14. The apparatus of claim 13 wherein said condition responsive signal is a digital signal having a frequency at least an order of magnitude greater than the predetermined maximum frequency of said flow responsive signal.

15. Apparatus for measuring fluid flow compensated for a variably physical condition of the fluid comprising:
means for generating a digital signal having a frequency related to fluid flow which varies up to a predetermined maximum;
means for generating a signal responsive to a variable physical condition of the fluid;
means for sampling said condition responsive signal for periods of time less in duration than the time interval between pulses in said flow responsive signal at said predetermined maximum frequency, said sampling means being responsive to pulses in said digital flow responsive signal to produce packets of pulses wherein the number of packets is related to fluid flow and wherein the number of pulses in each packet is at least 100 and is related in number to the variable physical condition of the fluid; and,
means for summing the number of pulses in said packets of pulses over a long period of time.

16. Apparatus for measuring fluid flow compensated for a variable physical condition of the fluid comprising:
means for generating a digital signal having a frequency related to fluid flow and a range ability greater than 10;
means for generating a signal responsive to a variable physical condition of the fluid, said physical condition being variable by at least 10 percent;
means for sampling said condition responsive signal responsively to pulses in said digital flow responsive signal to produce packets of pulses wherein the number of packets is related to fluid flow and wherein the number of pulses in each packet is related to the variable physical condition of the fluid; and,
means for summing the number of pulses in said packets of pulses over a long period of time.

17. Apparatus for measuring fluid flow compensated for a variable physical condition of the fluid comprising:
means for generating a digital signal having a frequency related to fluid flow;
means for generating a signal responsive to a variable physical condition of the fluid, said condition responsive signal having a value other than zero at the value of said condition at which no compensation of said fluid flow signal is desired;
means for sampling said condition responsive signal responsively to pulses in said digital flow responsive signal to produce packets of pulses wherein the number of packets is related to fluid flow and wherein the number of pulses in each packet is related to the variable physical condition of the fluid; and,
means for summing the number of pulses in the packets of pulses over a long period of time.

18. The apparatus of claim 17 wherein the range of said digital signal is greater than 10; and,
wherein said condition responsive signal is variable by more than 10 percent.

19. Apparatus for measuring fluid flow compensated for a variable physical condition of the fluid comprising:
means for generating a digital signal having a frequency related to fluid flow which varies up to a predetermined maximum;
means for generating a signal variable from a first value other than zero to a second value other than zero in response to a variable physical condition of the fluid;
means for sampling said condition responsive signal for time intervals less in duration than the interval between pulses in said digital flow responsive signal at said predetermined maximum frequency, said sampling means being responsive to pulses in said digital flow responsive signal to produce packets of pulses wherein the number of packets is related to fluid flow and wherein the number of pulses in each packet is related to the variable physical condition of the fluid; and,
means for summing the number of pulses in said packets of pulses over a long period of time.

20. The apparatus of claim 19 wherein said condition responsive signal has a value other than zero at the value of said variable physical condition for which no compensation of said fluid flow responsive signal is desired.

21. Apparatus for producing a directly readable, modified manifestation of the digital output of a fluid flowmeter comprising:
means for generating a first series of pulses having a frequency related to fluid flow;
means for generating packets of pulses which are commenced in response to pulses in said first series of pulses, the exact number of pulses in each packet being related to a factor by which the fluid flow manifestation is to be modified; and, means for producing the modified manifestation by subtracting the number of said flow related pulses from the number of pulses occurring in said packets of pulses during the same time interval.

22. Apparatus for measuring fluid flow in a flow channel where both flow rate and a physical condition of the fluid may be variable by more than 10 percent comprising:

means for producing a first signal related to fluid flow;

means for generating a second signal related to a variable condition of the fluid; and, means for summing over a long period of time the incremental mathematical product of the instantaneous fluid flow rate and said variable condition by generating packets of pulses where the exact number of pulses in each packet is at least 50 and is related to said variable physical condition and where the number of packets produced during said long period of time is related to fluid flow.

23. The system as defined in claim 22 wherein said summing means includes a bistable circuit, a first gate circuit enabled when said bistable circuit is set and disabled when said bistable circuit is reset, and means for setting said bistable circuit in response to said first signal.

24. The system as defined in claim 23 wherein said bistable circuit is a single shot multivibrator which provides an enabling signal for said first gate circuit, said enabling signal having a predetermined duration.

25. The system as defined in claim 24 where the duration of said enabling signal is varied by a linearity compensating circuit connected to receive said condition responsive pulses, said linearity circuit comprising an integrating capacitor for producing a D.C. voltage and a tuned circuit for varying the amplitude of pulses applied to said capacitor in accord with the frequency of the pulses, and circuit means for applying said D.C. voltage to said multivibrator for varying the duration of said enabling signal.

26. The system as defined in claim 22 further having a source of electrical pulses having a frequency related to friction losses in said first signal producing means, and means for adding said friction loss pulses to said first signal thereby to produce periodically additional packets of pulses.

27. The system as defined in claim 26 further having a friction compensation gate circuit connected to the output of said friction loss pulse source, and means for enabling said friction compensation gate circuit only when said first signal is being generated comprising a storage capacitor, a circuit for applying charging pulses to said capacitor in response to said first signal and for discharging said capacitor during the interval between the application of charging pulses, and means for connecting the voltage across said capacitor for enabling said friction compensation gate.

* * * * *

UNITED STATES PATENT OFFICE
CERTIFICATE OF CORRECTION

Patent No. 3,802,261   Dated April 9, 1974

Inventor(s) Carl W. Zimmerman and George V. Copland

It is certified that error appears in the above-identified patent and that said Letters Patent are hereby corrected as shown below:

Col. 6, line 5, equation (2) change

"$\psi = 100/(\delta f_{100} - \delta f_o)[(S_2N_2/S_1N_1) - \delta f_o)]$" to

--$\psi = 100/(\delta f_{100} - \delta f_o)[(S_2N_2)/(S_1N_1) - \delta f_o]$--

Col. 6, line 25, equation (3) change

"$\delta f_o = (S_2N_2'/S_1N_1')$" to

--$\delta f_o = (S_2N_2')/(S_1N_1')$--

Col. 6, line 32, equation (4) change

"$\delta f_{100} = (S_2N_2''/S_1N_1'')$" to

--$\delta f_{100} = (S_2N_2'')/(S_1N_1'')$--

Col. 6, line 41, equation (5) change

"$\delta f_n = (100/\psi_n)[(S_2N_2/S_1N_1) - \delta f_o] + \delta f_o$" to

--$\delta f_n = (100/\psi_n)[(S_2N_2)/(S_1N_1) - \delta f_o] + \delta f_o$--

UNITED STATES PATENT OFFICE
CERTIFICATE OF CORRECTION

Patent No. 3,802,261     Dated April 9, 1974

Inventor(s) Carl W. Zimmerman and George V. Copland     Page - 2

It is certified that error appears in the above-identified patent and that said Letters Patent are hereby corrected as shown below:

Col. 7, line 55, equation (7) change

"$S_3 = S_1(\delta f_{100} - \delta f_o/f_o) = 375$" to

--$S_3 = S_1[(\delta f_{100} - \delta f_o)/f_o] = 375$--

Col. 15, line 9, equation (12) change

"$S_4 = (S_3 \delta/S)[f_2' + P_2(f_2' - f_1'/P_1 - P_2)]$" to

--$S_4 = (S_3 \delta/S)[f_2' + P_2(f_2' - f_1')/(P_1 - P_2)]$--

Signed and sealed this 27th day of August 1974.

(SEAL)
Attest:

McCOY M. GIBSON, JR.
Attesting Officer

C. MARSHALL DANN
Commissioner of Patents